United States Patent
Konstandelos

[19]

[11] Patent Number: 5,977,874
[45] Date of Patent: Nov. 2, 1999

[54] RELATING TO MOTION DETECTION UNITS

[75] Inventor: John Konstandelos, Doncaster, United Kingdom

[73] Assignee: Pyronix, Ltd., United Kingdom

[21] Appl. No.: 08/983,021

[22] PCT Filed: Jun. 28, 1996

[86] PCT No.: PCT/GB96/01567

§ 371 Date: May 7, 1998

§ 102(e) Date: May 7, 1998

[87] PCT Pub. No.: WO97/01766

PCT Pub. Date: Jan. 16, 1997

[30] Foreign Application Priority Data

Jun. 29, 1995 [GB] United Kingdom .................... 9513251

[51] Int. Cl.⁶ .................................................... G08B 13/18
[52] U.S. Cl. .......................... 340/554; 333/120; 455/327; 455/330
[58] Field of Search .................................... 333/117, 120, 333/161; 455/326, 327, 330; 342/28, 70; 340/554

[56] References Cited

U.S. PATENT DOCUMENTS

| 3,703,722 | 11/1972 | Gershberg et al. | 340/554 |
| 3,955,194 | 5/1976 | Chua | 333/120 |
| 4,571,564 | 2/1986 | Znojkiewicz | 455/330 |
| 5,262,783 | 11/1993 | Philpott et al. | 455/327 |
| 5,471,664 | 11/1995 | Kim | 455/327 |
| 5,587,713 | 12/1996 | Pfizenmaier et al. | 455/327 |

OTHER PUBLICATIONS

Stephen A. Mass, "Nonlinear Microwave Circuits," Library of Congress Cataloging–in–Publication Data, Artech House, Inc., 1988.

*Primary Examiner*—Daniel J. Wu
*Assistant Examiner*—John Tweel, Jr.
*Attorney, Agent, or Firm*—Fish & Richardson P.C.

[57] ABSTRACT

A motion detection unit for detecting motion by means of Doppler frequency shift which comprises: a microwave circuit board comprising an oscillator, a hybrid coupler circuit element and a mixer; an antenna board comprising at least one transmit and receive antenna; and a ground plane layer, the two boards being superimposed with the ground plane layer intervening, wherein, in operation, the hybrid coupler circuit element divides power from the oscillator into power for the antenna transmission signal and local oscillator (LO) power to the mixer, and directs a received signal from the antenna to the mixer, the local oscillator (LO) power and the received signal being combined in the mixer to produce a Doppler signal output.

16 Claims, 2 Drawing Sheets

RELATING TO MOTION DETECTION UNITS

This invention relates to motion detection units, and more particularly to a motion detection unit for detecting a moving person or object by means of a Doppler frequency shift.

BACKGROUND OF THE INVENTION

The use of the Doppler effect for detecting notion is well known. For example, in microwave intruder detection devices it is known to provide a diode oscillator mounted in a cavity resonator such as a simple wave guide tube. A diode mixer also mounted in the tube provides an output at the Doppler frequency. Such devices are very difficult to manufacture accurately, and thus in mass-production give rise to high rejection rates.

In GB1448266 there is described a microwave transmission-line circuit comprising a hybrid junction and four split-tee junctions, two of the split-tee junctions constituting power dividers and the other two constituting power combiners, wherein the inputs of the two dividers are respectively connected to two ports of the hybrid junction, wherein a first output of a first and a first output of the second of the dividers are respectively connected to a first input of a first and a first input of the second of the combiners, wherein the second outputs of the first and of the second dividers are respectively connected to the second inputs of the second and of the first combiners, and wherein the lengths of the interconnections of the split-tee junctions are such that the difference between the signal phase angles x and y appearing respectively at the output of the first and second combiners when respectively a signal is applied to the input of the first divider and when a signal is applied to the input of the second divider, is substantially an odd multiple of 90 degrees. It will be appreciated that the circuit described is relatively complicated, requires a relatively large number of components, and takes up a relatively large amount of space.

The oscillator and the aerial are each separately mounted, and, together with the necessary coupling means to the circuit, take up even more space.

In WO92/09905 there is described a motion detector unit for detecting motion by means of Doppler frequency shift which comprises a microwave circuit board, an antenna circuit board, and a ground plane layer, the two boards being superimposed with the ground plane layer intervening, the microwave circuit board comprising an oscillator and a mixer, and the antenna circuit board comprising transmit and receive antennae, each antenna having a respective feed stripline which substantially overlies an associated stripline on the microwave circuit board, the ground plane layer having, for each antenna, a respective slot to provide coupling between the microwave circuit and the antenna, the slot being resonant at the fundamental frequency of the oscillator, with said feed stripline and said associated stripline lying orthogonal to the resonant dimension of the slot and extending beyond the slot.

This construction provides many advantages over earlier designs, and the unit is quite suitable for mass-production techniques. Nevertheless, the unit still takes up a relatively large amount of space because of the need to provide at least two antennae on the antenna circuit board. This can be a disadvantage, particularly in certain intruder detection devices.

SUMMARY OF THE INVENTION

The present invention provides a motion detection unit for detecting motion by means of Doppler frequency shift, whereby an oscillator is connected to a transmit and receive antenna and a mixer via a circuit element adapted to divide the oscillator power between the antenna and the mixer and to direct a received signal from the antenna to the mixer to produce a Doppler signal at the mixer output.

In a first aspect, the present invention provides a motion detection unit for detecting motion by means of Doppler frequency shift which comprises:

a microwave circuit board comprising an oscillator, a hybrid coupler circuit element and a mixer;

an antenna board comprising at least one transmit and receive antenna; and a ground plane layer, the two boards being superimposed with the ground plane layer intervening, wherein, in operation, the hybrid coupler circuit element divides power from the oscillator into power for the antenna transmission signal and local oscillator (LO) power to the mixer, and directs a received signal from the antenna to the mixer, the local oscillator (LO) power and the received signal being combined in the mixer to produce a Doppler signal output.

In a second aspect, the invention provides a motion detection unit for detecting notion by means of Doppler frequency shift, whereby an oscillation is connected to a transmit and receive antenna and a single diode mixer via a circuit element adapted to divide the oscillator power between the antenna and the mixer and to direct a received signal from the antenna to the single diode mixer to produce a Doppler signal at the mixer output.

Preferably the hybrid coupler circuit element is a printed element on the circuit board, and, for example, it can be a 180° hybrid, especially a ring hybrid or "rat-race". Other hybrid circuits such as branch-line couplers can also be used. Preferred hybrid coupler circuit elements according to the invention can have low attenuation.

By employing a single antenna both to transmit and receive the microwave signals the total size of the motion detector unit can be substantially reduced.

Any suitable oscillator can be used in the motion detector unit of the invention, although an FET type oscillator employing a mechanically tunable dielectric resonator is preferred.

The ring hybrid can be a four port circuit with ports connected to the oscillator, the antenna and the mixer. The ring hybrid divides the power entering any port between adjacent ports. The remaining port is isolated from the input port because the track distance to the isolated port in an anticlockwise direction differs by the equivalent of half a wavelength to the distance in a clockwise direction, thus resulting in voltage cancellation at that port. The oscillator port, the antenna port and the two mixer ports are preferably separated, respectively, by a track distance equivalent to one quarter of a wavelength in one direction. In the other direction, the oscillator port is preferably separated from the adjacent mixer port by a track distance equivalent to three quarters of a wavelength.

Other configurations are possible. For example, the antenna port, the oscillator port and the two mixer ports can be separated, respectively, by a track distance equivalent to a quarter of a wavelength in one direction, and, in the other direction, the antenna port can be separated from the adjacent mixer port by a track distance equivalent to three quarters of a wavelength.

The mixer is preferably a single diode mixer, but other suitable mixers such as double balanced diode mixers could be used if desired. If a double balanced mixer is used then a second hybrid coupler, such as a ring hybrid or a 90 degree hybrid, would then be used to feed the microwave signal and the local oscillator power to the mixer diodes in the appropriate amplitude and phase relationships.

Preferably the microwave circuit and the antenna circuit are superimposed and preferably share a common ground plane, although they could each have their own individual ground planes. In the second aspect of the invention the microwave circuit and antenna could also comprise a single board with the microwave circuit and antenna etched on one face and the ground plane on the opposite face.

The antenna board can comprise only a single transmit and receive microstrip patch if desired, and for many applications this will be the preferred configuration. Arrays of two or more transmit and receive patches coupled together can, however, be used, where greater directivity is required. Elements other than rectangular microstrip patches can also be used. For example, printed dipoles or slots, or any other printed element appropriate to the circuit topology and application.

In the motion detection unit of the first aspect of the invention, the two boards are superimposed, preferably in a stacked back-to-back configuration, with a ground plane layer intervening. In a preferred arrangement, the antenna circuit board has a conductive layer on one face only, and the microwave circuit board has a printed circuit on one face and a ground plane layer on its opposite face.

Preferably power is transferred between the microwave circuit board and the antenna circuit board by means of aperture coupling, although other coupling techniques could be used if desired. In the aperture-coupling technique, the microwave energy from a first feed line is coupled to a second feed line through a common aperture, which may take the form either of a small circular hole or a thin slot between the feed lines. Preferably power is transferred between the microwave circuit and the antenna circuit via a slot etched into the ground plane layer. The slot is preferably orthogonal to the antenna and microwave circuit feedlines, which overlap and are terminated in open circuits. To reduce circuit area, the feedlines can be bent through 90 degrees after crossing the slot. Alternatively, the aperture coupling way comprise first and/or second feed striplines terminating in a T-section comprising a cross-bar strip parallel with the slot as described in WO92/09905. In a still further embodiment, the microwave circuit feed stripline may be coupled directly to the antenna patch by arranging the slot between the stripline and the patch and omitting the antenna feed stripline.

BRIEF DESCRIPTION OF THE DRAWINGS

Various embodiments of detection units according to the invention will now be more particularly described, by way of example only, with reference to the accompanying Drawings, in which.

DESCRIPTION

Figure 1:
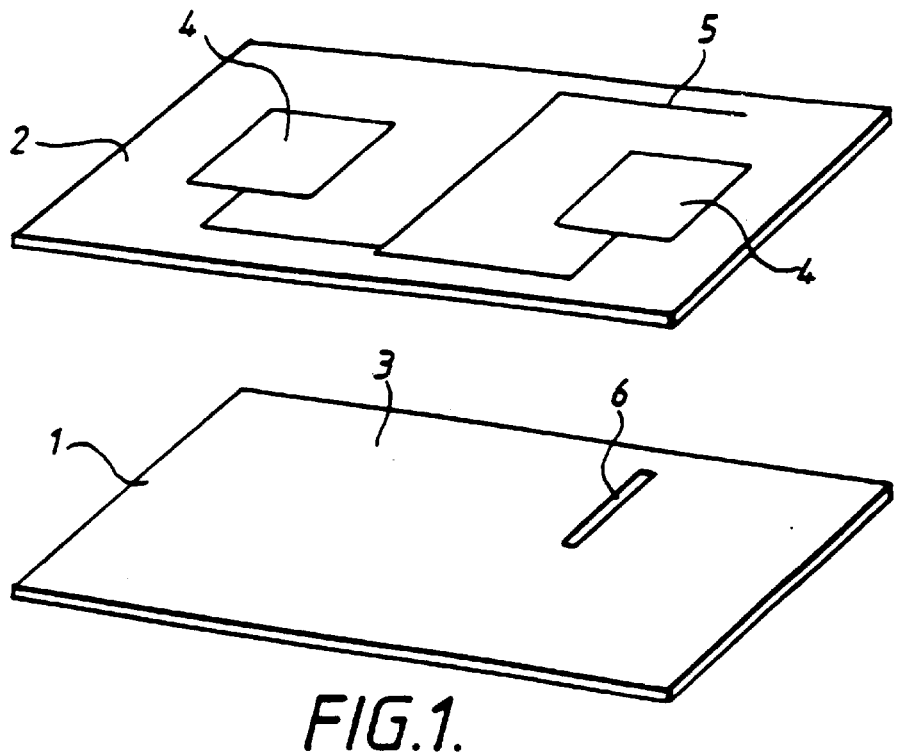
FIG. 1 illustrates the arrangement of the circuit boards.

Referring firstly to FIG. 1, the unit comprises two circuit boards 1, 2 mounted adjacent and parallel to one another, in a stacked, back-to-back configuration. Circuit board 1 would normally be housed in a screened enclosure (not shown). Board 1 accommodates microwave circuitry on its inwardly-directed face (not shown), and on its exposed face has a ground plane layer 3. Circuit board 2 has an antenna consisting of a pair of microstrip patches 4 which are coupled together and joined to a feed line 5. The antenna both transmits and receives the microwave signals. Circuit board 1 has a resonant slot 6, the purpose of which will be explained in more detail hereinafter.

Figure 2:
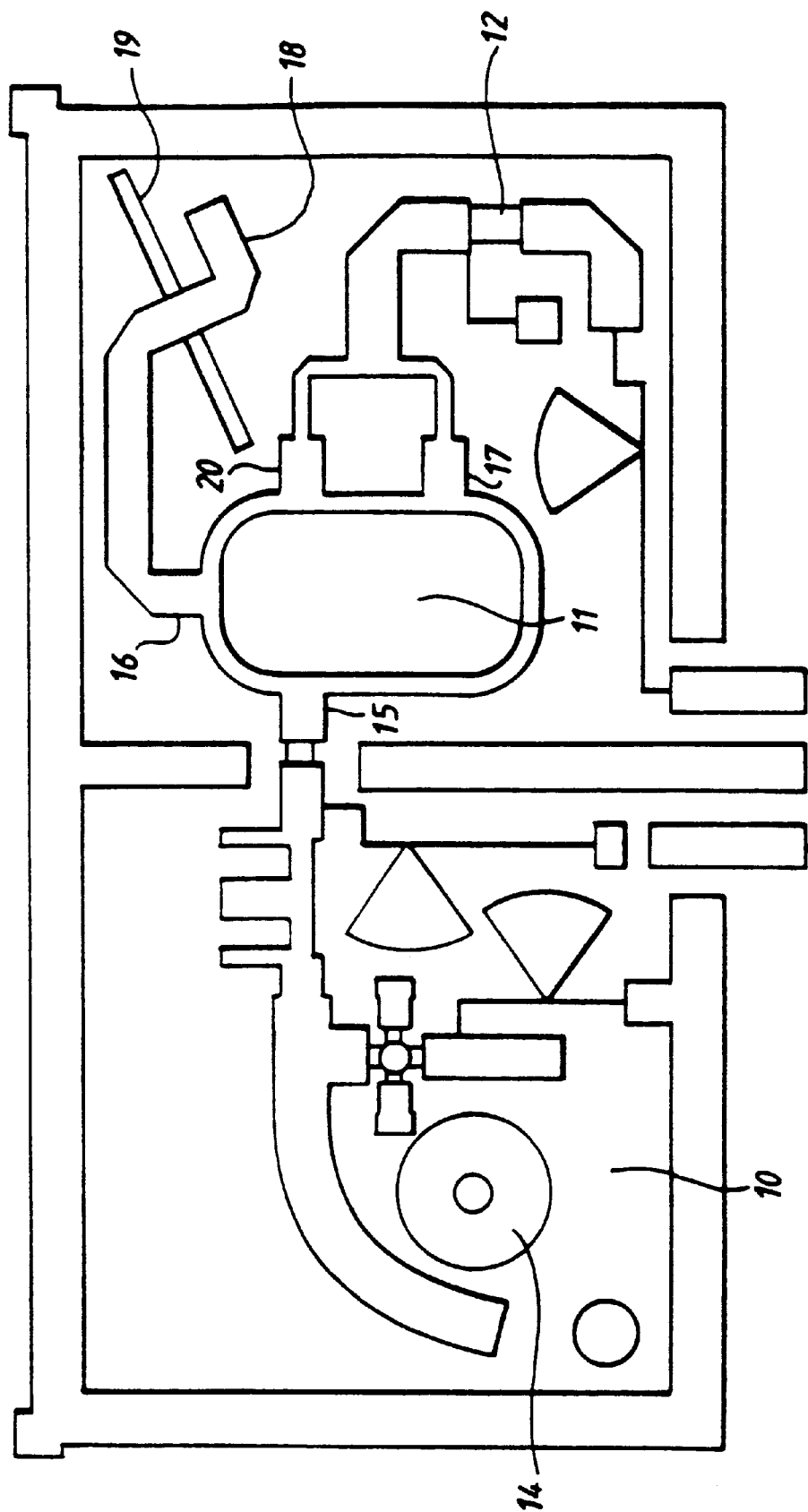
FIG. 2 shows a circuit board layout suitable for use in a detector unit according to the invention.

FIG. 2 shows the microwave circuit board 1 in more detail as viewed from the component side of the board. The circuit comprises an oscillator 10, a ring hybrid coupler circuit 11 and a single diode mixer 12. Power is supplied to the oscillator 10 by a supply line 13. The oscillator is a mechanically tunable dielectric resonator oscillator 14.

The output of the oscillator is provided to a first port 15 of the ring hybrid 11 where it is split into two components, a clockwise component directed to the antenna port 16 and an anticlockwise component directed to the local oscillator port 17 of the mixer 12. The second mixer port 20 is isolated from the oscillator port 15 as explained previously. The clockwise component of the oscillator output travels from the port 16 along the feed line 18 to the slot coupler 19 from whence it is coupled to the antenna feed line 5, as will be more particularly described with reference to FIG. 3. The power to the antenna is radiated over the coverage area.

Reflected signals are received by the antenna and coupled to the ring hybrid via the same microstrip lines and resonant slot. Received signals from the antenna patches 4 thus enter the feed line 5, are coupled via the slot coupler 19 to the feed line 18, and enter the ring hybrid at the antenna port 16. Here the received signal is divided into a clockwise component which passes to the RF port 20 of the mixer 12, and an anticlockwise component which is directed to the oscillator port and is dissipated. Although some of the received power is lost in this way, it is found in practice that more than enough power is available for comparative purposes, and the substantial advantages of the use of the ring hybrid outweigh this disadvantage. The LO port 17 is isolated from the antenna port 16 as previously explained.

The total length of the ring hybrid track is one and one half wavelength and the track distances between ports 15 and 16, ports 16 and 20, and ports 20 and 17 are respectively each one quarter wavelength. The result is that the sum of the received signal and the LO signal when mixed in the single diode mixer 12 produces an IF Doppler signal which could, for example, be of the order of 100 Hz at the IF port which can be extracted, filtered and processed in known manner.

Figure 3:
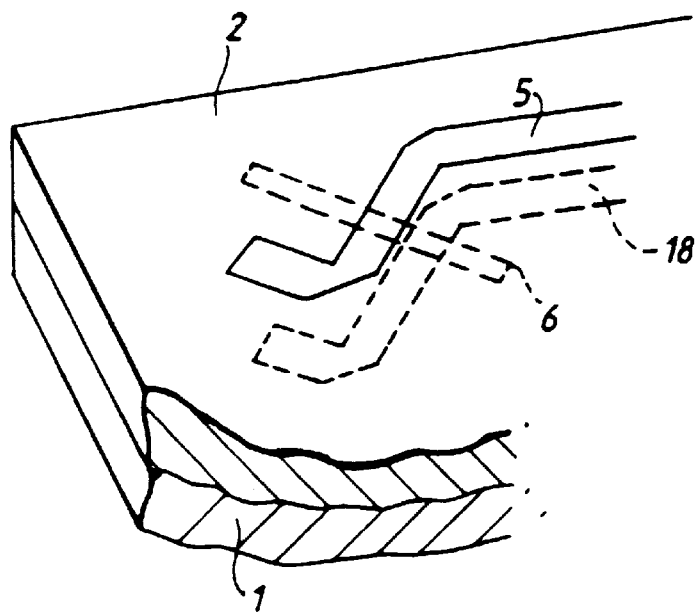
FIG. 3 shows features of the circuit boards which provide coupling between the microwave circuit and the antenna circuit.
Figure 3:
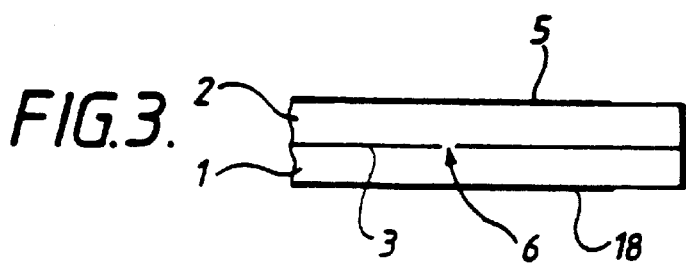

Referring now to FIG. 3, there is illustrated the coupling means between the microwave circuit and the transmitter/receiver antenna circuit. The circuit boards 1 and 2 are superimposed such that the slot 6 in the ground plane 3 lies orthogonally between the feed line 18 and the antenna feed line 5. The feed lines 5 and 18 extend beyond the slot and are bent through 90 degrees before terminating in open circuits.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). This invention extends to any novel one, or any novel combination, of the features disclosed in this specification (including any accompanying claims, abstract and drawings), or to any novel one, or any novel combination, of the steps of any method or process so disclosed.

What is claimed is:

1. A motion detection unit to detect motion by means of Doppler frequency shift, comprising:

a microwave circuit board including an oscillator, a hybrid coupler circuit element and a mixer;

an antenna board including at least one transmit and receive antenna; and a ground plane layer wherein, in operation, the hybrid coupler circuit element divides power from the oscillator into power for an antenna transmission signal and local oscillator power for the mixer, and directs a received signal from the antenna to the mixer, the local oscillator power and the received signal being combined in the mixer to produce a Doppler signal output, said microwave circuit board and said antenna board being superimposed with the ground plane layer intervening and in which an oscillator port, an antenna port and the two mixer ports are separated, respectively, by a track distance equivalent to one-quarter of a wavelength in one direction, and in the other direction, one of the antenna port and the oscillator port being separated from an adjacent mixer port by a track distance equivalent to three-quarters of a wavelength.

2. The motion detection unit of claim 1, in which the hybrid coupler circuit element is a printed element on the circuit board.

3. The motion detection unit of claim 1 or 2, in which the hybrid coupler element is a ring hybrid.

4. The motion detection unit of claim 1 or 2, in which the hybrid coupler circuit element is a branch-line coupler.

5. The motion detection unit of claim 1, in which the oscillator is an FET-type oscillator.

6. The motion detection unit of claim 1, in which the hybrid coupler circuit element is a ring hybrid having a four port circuit with a port connected to each of the oscillator and the antenna, and with two ports connected to the mixer.

7. A motion detection unit to detect motion by means of Doppler frequency shift, comprising:

a microwave circuit board including an oscillator, a hybrid coupler circuit element and a mixer;

an antenna board including at least one transmit and receive antenna; and a ground plane layer, wherein the hybrid coupler circuit element is a four port circuit with a port connected to each of the oscillator and the antenna, and with two ports connected to the mixer, and where in operation, the hybrid coupler circuit element divides power from the oscillator into power for an antenna transmission signal and local oscillator power for the mixer, and directs a received signal from the antenna to the mixer, the local oscillator power and the received signal being combined in the mixer to produce a Doppler signal output, said microwave circuit board and said antenna board being superimposed with the ground plane layer intervening, in which the oscillator port, the antenna port and the two mixer ports are separated, respectively, by a track distance equivalent to one-quarter of a wavelength in one direction, and in the other direction, the oscillator port being separated from an adjacent mixer port by a track distance equivalent to three-quarters of a wavelength.

8. A motion detection unit to detect motion by means of Doppler frequency shift, comprising:

a microwave circuit board including an oscillator, a hybrid coupler circuit element and a mixer;

an antenna board including at least one transmit and receive antenna; and a ground plane layer, wherein the hybrid coupler circuit element is a four port circuit with a port connected to each of the oscillator and the antenna, and with two ports connected to the mixer, and where in operation, the hybrid coupler circuit element divides power from the oscillator into power for an antenna transmission signal and local oscillator power for the mixer, and directs a received signal from the antenna to the mixer, the local oscillator power and the received signal being combined in the mixer to produce a Doppler signal output, said microwave circuit board and said antenna board being superimposed with the ground plane layer intervening, in which the antenna port, the oscillator port and the two mixer ports are separated, respectively, by a track distance equivalent to a quarter of a wavelength in one direction, and, in the other direction, the antenna port being separated from an adjacent mixer port by a track distance equivalent to three-quarters of a wavelength.

9. The motion detection unit of claim 1, in which the mixer is a single diode mixer.

10. The motion detection unit of claim 1, in which the antenna board comprises a single transmit and receive microstrip patch.

11. The motion detection unit of claim 1, in which the antenna board comprises an array of two or more transmit and receive patches.

12. The motion detection unit of claim 11, in which the antenna circuit board has a conductive layer on one face only, and the microwave circuit board has a printed circuit on one face and a ground plane layer on its opposite face.

13. The motion detection unit of claim 1, in which power is transferred between the microwave circuit board and the antenna board by means of an aperture coupling.

14. The motion detection unit of claim 13, in which power is transferred between the microwave circuit board and the antenna via a slot etched into the ground plane layer.

15. The motion detection unit of claim 14, in which the slot is orthogonal to the antenna and microwave circuit feedlines, which feedlines overlap and are terminated in open circuits.

16. The motion detection unit of claim 15, in which the feedlines are bent through 90° after crossing the slot.

* * * * *